United States Patent
Romero

[11] Patent Number: 5,882,059
[45] Date of Patent: Mar. 16, 1999

[54] ADJUSTABLE VISOR EXTENSION

[76] Inventor: Jose L. Romero, 832 Arlington Dr., West Palm Beach, Fla. 33415

[21] Appl. No.: 985,037

[22] Filed: Dec. 4, 1997

Related U.S. Application Data

[60] Provisional application No. 60/032,403 Dec. 10, 1996.
[51] Int. Cl.⁶ .................................................... B60J 3/02
[52] U.S. Cl. ........................................ 296/97.6; 296/97.8
[58] Field of Search ................................. 296/97.8, 97.6, 296/97.1; 160/DIG. 3

[56] References Cited

U.S. PATENT DOCUMENTS

| | | | |
|---|---|---|---|
| 2,432,674 | 12/1947 | Office | 296/97.6 X |
| 4,824,161 | 4/1989 | Lee | 296/97.8 |
| 4,944,548 | 7/1990 | Payne et al. | 296/97.8 |
| 5,165,748 | 11/1992 | O'Connor | 296/97.6 |
| 5,301,856 | 4/1994 | Newsome | 296/97.6 X |
| 5,379,929 | 1/1995 | Eskandry | 296/97.6 X |
| 5,651,577 | 7/1997 | Lacy et al. | 396/97.8 X |

FOREIGN PATENT DOCUMENTS

| | | | |
|---|---|---|---|
| 2697478 | 5/1994 | France | 296/97.6 |
| 2094248 | 9/1982 | United Kingdom | 296/97.6 |

*Primary Examiner*—Joseph D. Pape
*Attorney, Agent, or Firm*—Bowen, Lhota & Firtell, P.A.; David P. Lhota

[57] ABSTRACT

An adjustable visor extension that provides increased window coverage for blocking out sunlight, headlights, and ultraviolet rays when attached to a visor, wherein the visor extension comprises a visor wrap having opposing flaps which overlap to secure the visor wrap to a visor, a vertically adjustable shade extending from the visor wrap, a shield attached to the lower end of the shade for folding the shield into the shade and a plurality of hook-and-loop patches used for holding the shade and shield in various folded positions.

19 Claims, 9 Drawing Sheets

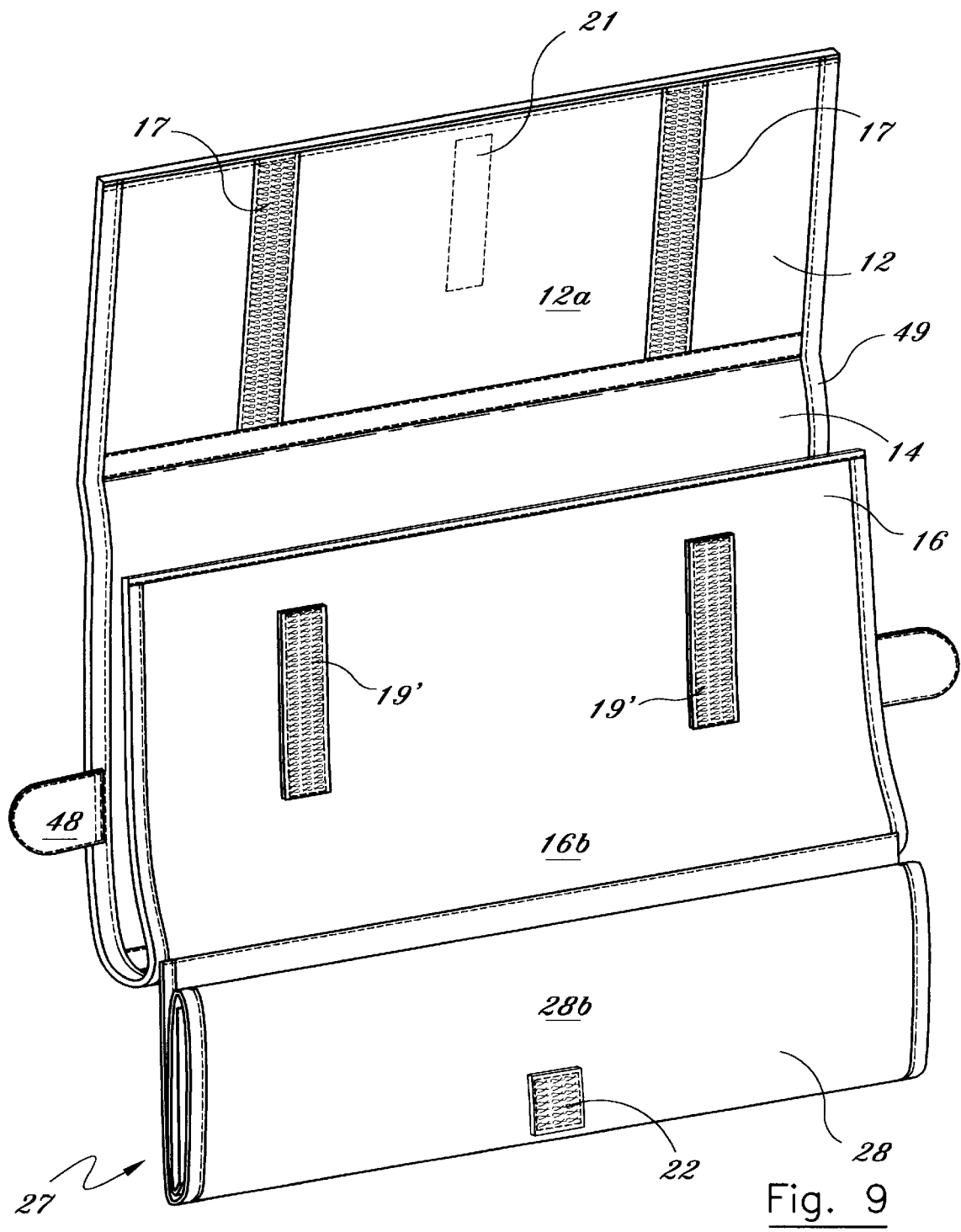

ADJUSTABLE VISOR EXTENSION

CROSS-REFERENCE TO RELATED APPLICATIONS

This application claims the benefit of U.S. Provisional Application Ser. No. 60/032,403, filed Dec. 10, 1996.

STATEMENT REGARDING FEDERALLY SPONSORED RESEARCH OR DEVELOPMENT

Not applicable.

BACKGROUND OF THE INVENTION

1. Field of the Invention

The invention relates generally to universal extenders for visors in all types of vehicles, and more particularly to an adjustable visor extension that provides increased window coverage for blocking out sunlight, headlights, and ultraviolet rays.

2. Description of Related Art

Existing visors in vehicles, such as automobiles and trucks, do not always adequately shade the driver and/or passenger from direct sunlight, damaging ultraviolet light, and headlights from oncoming traffic. It is known that sunlight can cause skin cancer and can obstruct a driver's vision. At times, sunlight and headlights enter the side window or windshield at angles which are impossible for conventional visors to intercept. In addition, the angle at which light enters a vehicle constantly changes. Existing visors only provide minimal coverage. They cannot block light which penetrates between the visor and rear view mirror, through the windshield below the visor, and around the visor through the side/door windows. This not only causes the driver and passenger discomfort, but can obstruct a driver's vision. Currently, drivers use towels, sheets, maps, and other crude methods for shading themselves from the sun and ultraviolet light. Accordingly, there exists a need for an adjustable extension that extends the protection of visors to provide better protection to drivers and passengers.

Several devices are contemplated in the background art for extending the protection of visors. However, none of these references solve the above-noted problems. The visor attachments known are not adequately adjustable, and only provide minimal levels of protection. That is, known extensions are not adjustable in length and width. In addition, known visor adapters do not adequately block light entering from the side windows. For instance, U.S. Pat. Nos. 5,678,880, 5,040,840, 4,352,519, and 2,458,125 comprise rigid shield attachments which only provide one extra level of protection and do not adjust vertically or horizontally. The noted references require complicated hinge structure for folding the extension behind the visor or down from the visor. These references also clip to the visor, which can cause damage and interfere with the attachment of other devices, such as garage door openers. Roll-up shades are also known in the art. However, they are not attachable to visors and do not address the particular problems noted herein.

As the above-noted background art fails to solve and address the problems noted herein, there exists a need for a visor extension that may be conveniently adjusted in length and sideways. The present invention solves these problems by providing an adjustable visor extension that can be adjusted for several levels of protection, can shield the entire length of the side window, and can be conveniently slid sideways for adjusting to the angle of the light. The instant invention also incorporates structure for holding articles, such as garage door openers, security gate cards, and pens. While the invention is described in detail below with respect to automobiles, it may also be used in trucks, airplanes, and other vehicles able to support and accommodate the instant invention.

BRIEF SUMMARY OF THE INVENTION

In accordance with the foregoing, it is an object of the instant invention to provide a visor extension that is vertically and horizontally adjustable.

It is an object of the instant invention to provide a visor extension that fits all types of visors of varying sizes.

It is an additional object of the instant invention to provide a visor extension that extends the protection offered by visors.

It is a further object of the instant invention to provide a visor extension that can extend to the bottom of the side/door window to fully shade a passenger from the sun and ultraviolet light.

It is still another object of the instant invention to provide a visor extension that may be adjusted to extend the visor protection a predetermined distance to shield the driver from headlights or sunlight that would otherwise pass below the visor and obstruct the driver's vision.

It is still an additional object of the instant invention to provide a visor extension that may be slid sideways to extend the horizontal protection of the visor.

In light of these and other objects, the instant invention provides a visor extension comprising a visor wrap, an adjustable shade, a reinforcement shield, and an attaching means for securing the visor extension to the visor and for securing the shade in selected positions. The visor wrap comprises at least one sheet which wraps around the visor and is secured thereto by the attaching means. Preferably, the sheet comprises two flaps and a center panel whereby the two outside flaps overlap and attach to each other. The adjustable shade preferably comprises a second sheet secured at one end to the visor wrap, and at the opposite end to the reinforcement shield. The shade is folded upward about the shield several times and releasably attached to the outside surface of the visor wrap when not in use. The shade may be unfolded into several different positions to adjust the level of protection below the visor. That is, in one position the shade extends minimally below the visor to shield sunlight or headlights penetrating just below the visor. The shade may also be unfolded to intermediate positions for shielding light further below the visor. When fully unfolded, maximum shielding protection is provided. In the fully opened position, the shield fits between the window and door frame to shield light coming in through the side/door window. By moving the visor toward the door window and completely unfolding the shade from the visor wrap, the driver or passenger is completely shielded. If sunlight is still entering the vehicle from the side of the visor, the visor wrap may be slid outward or horizontally from the visor to a position that shades the driver or passenger.

The preferred attaching means employed by the instant invention comprises hook and loop. At least one hook and loop strip is attached to the outside surface of one panel and the inside surface of another panel for attaching to each other when securing the visor wrap to the visor. The adjustable shade also includes a number of hook and loop strips strategically placed for securing the shade in its various positions. Other attaching means may be employed with the instant invention, including, but not limited to, snaps and other hardware.

In accordance with these and other objects which will become apparent hereinafter, the instant invention will now be described with particular reference to the accompanying drawings.

BRIEF DESCRIPTION OF THE SEVERAL VIEWS OF THE DRAWINGS

FIG. 9 is a perspective view of the preferred visor extension of the instant invention illustrating an alternative method for attaching the upper flap to the lower flap.

DETAILED DESCRIPTION OF THE INVENTION

Figure 3:
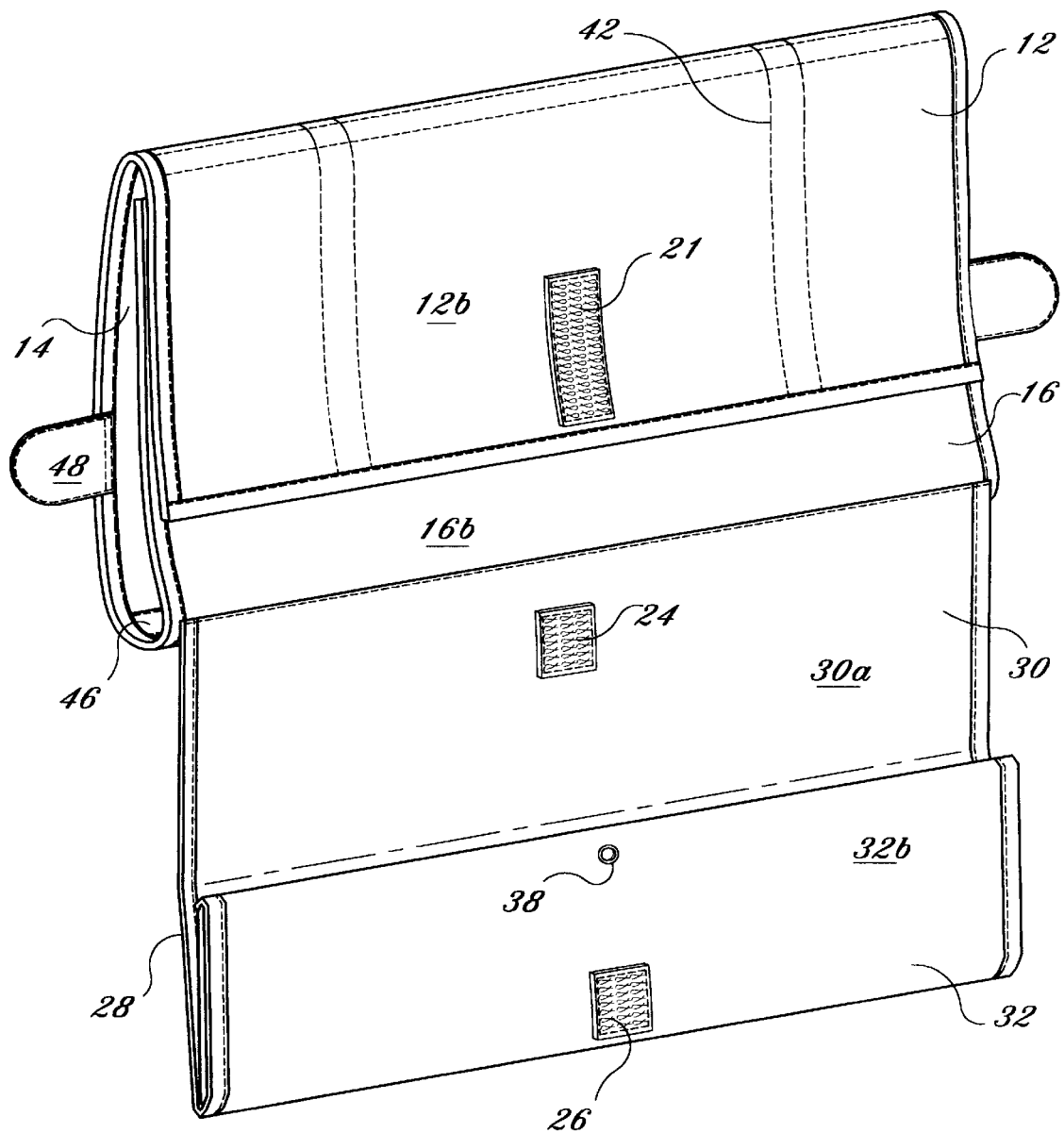
FIG. 3 is a perspective view of the visor extension of the instant invention showing the adjustable shade in a second open position.
Figure 4:
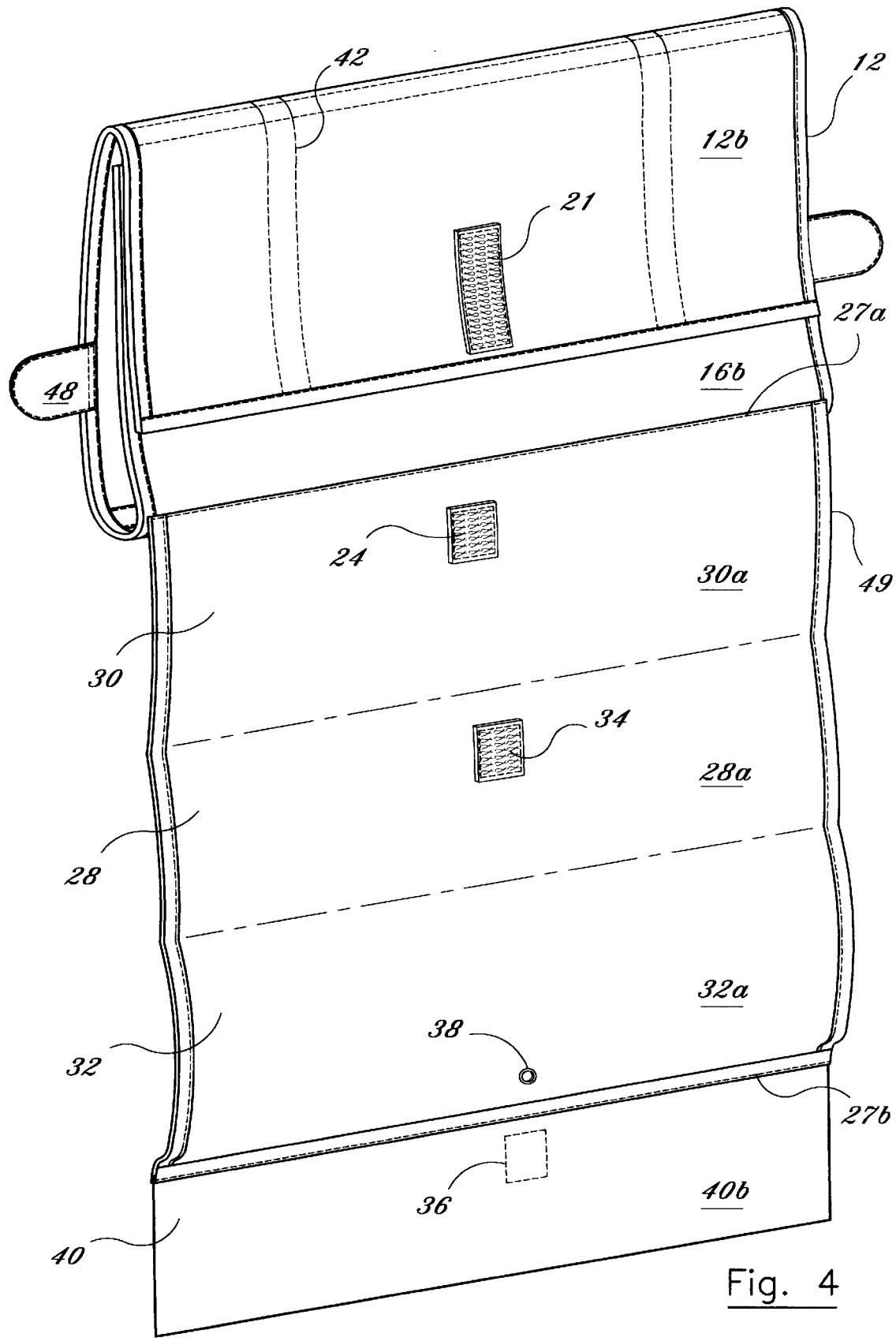
FIG. 4 is a perspective view of the visor extension of the instant invention showing the adjustable shade in its fully opened position.
Figure 5:
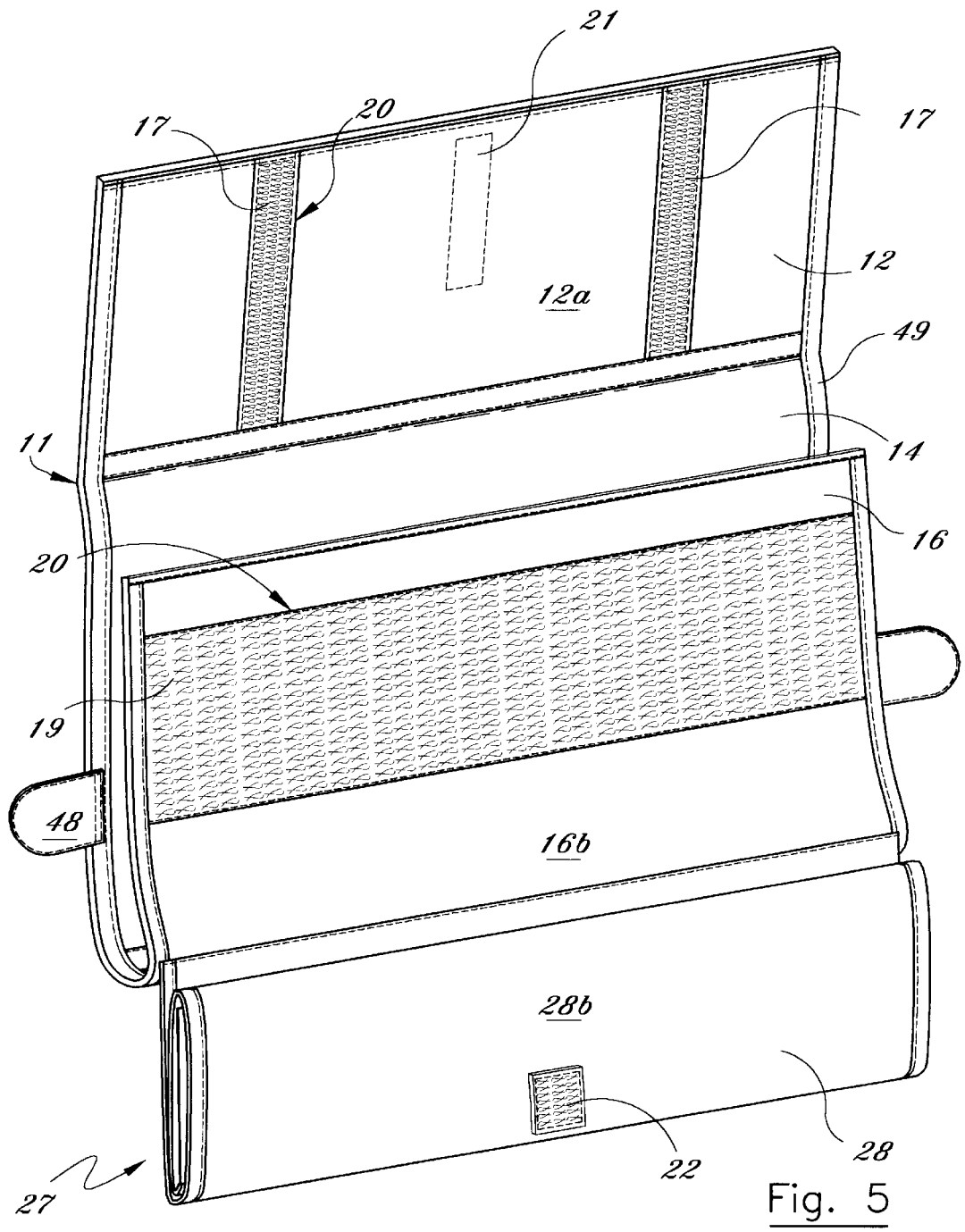
FIG. 5 is a perspective view of the visor extension of the instant invention showing the visor wrap's upper flap opened, to illustrate the structure which attaches the upper flap to the lower flap.
Figure 6:
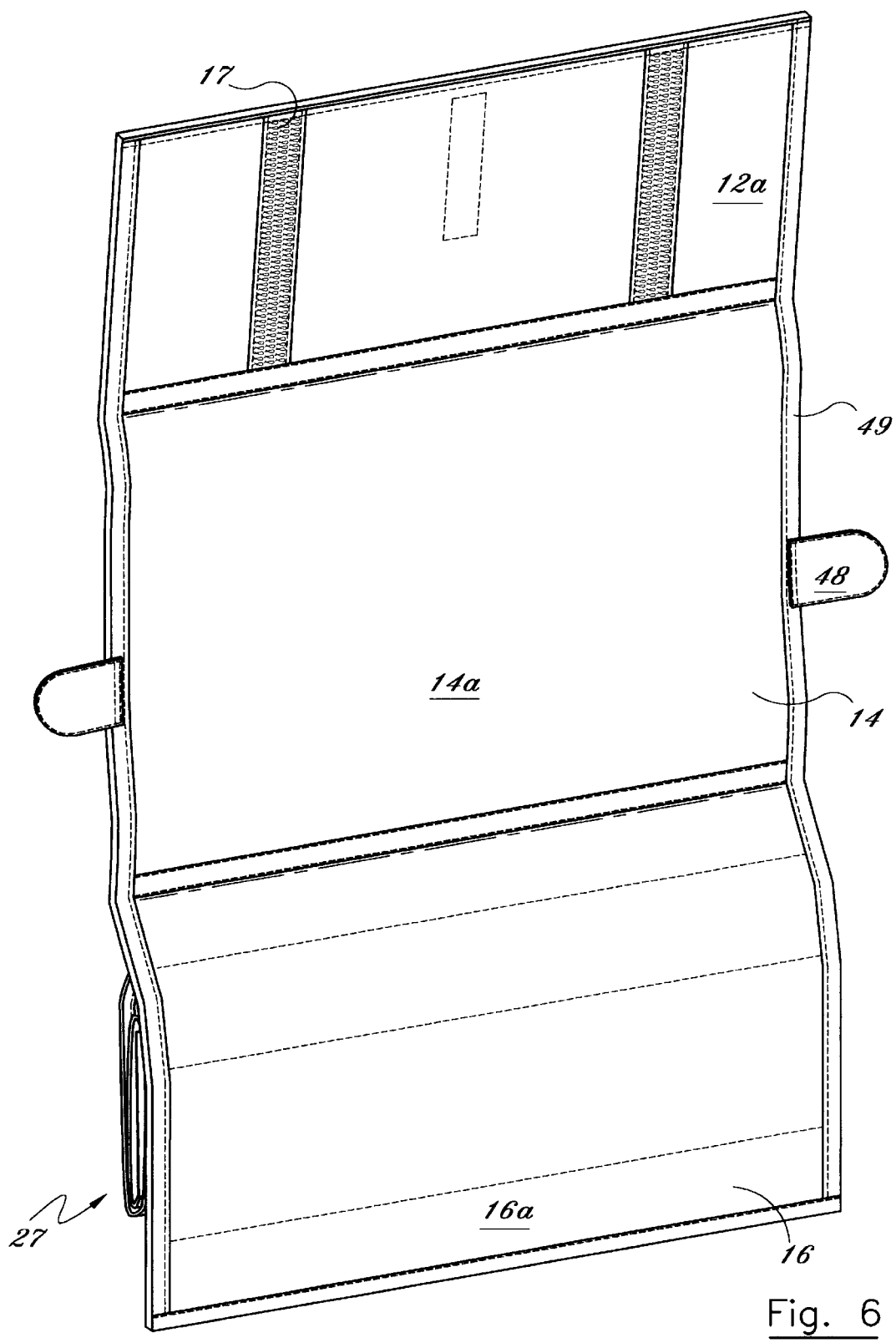
FIG. 6 is a perspective view of the visor extension of the instant invention illustrating the visor wrap completely open, as it would appear prior to attachment to a visor.
Figure 7:
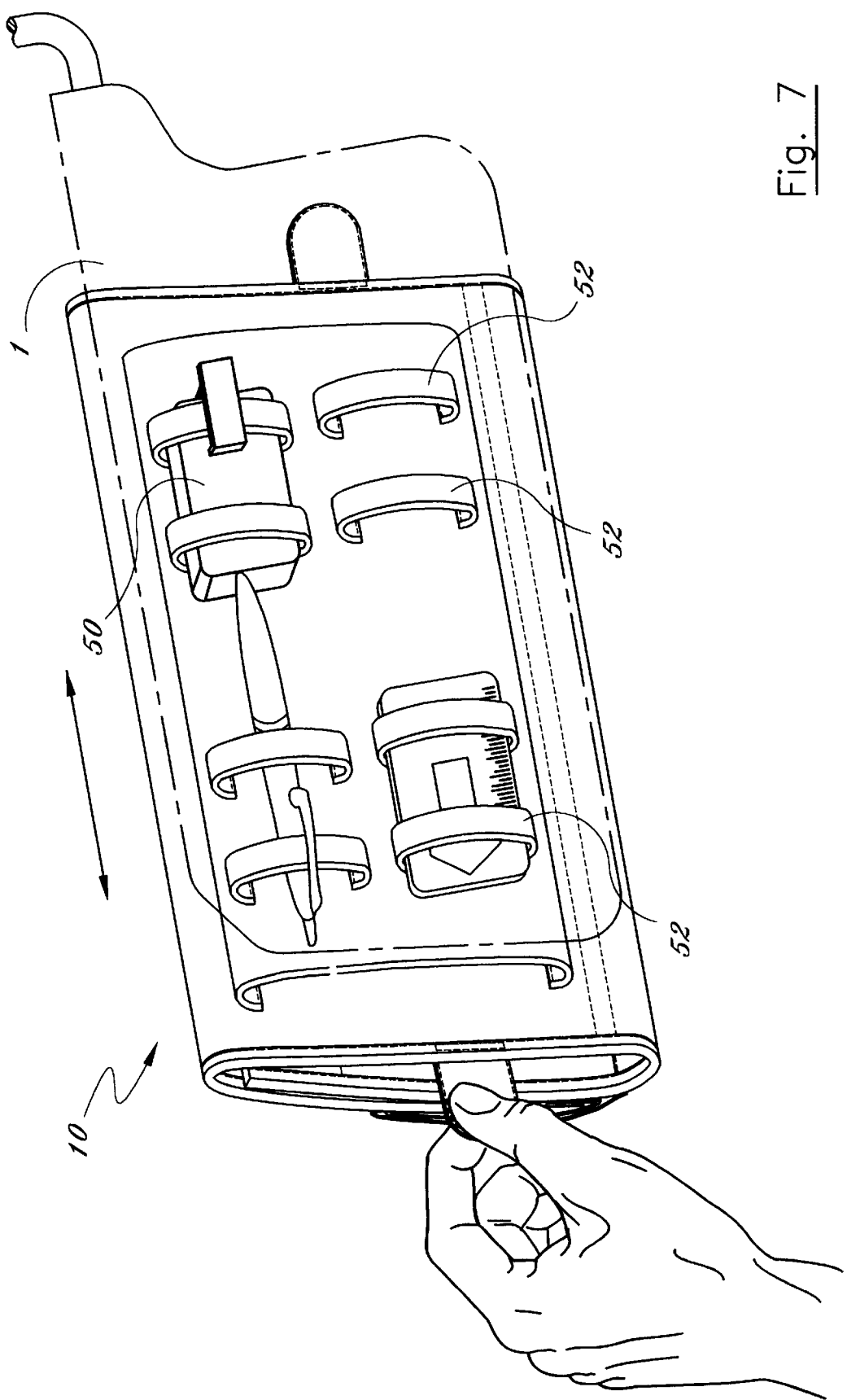
FIG. 7 is a perspective view of the visor extension of the instant invention illustrating its mounting to a visor and the additional organizing pocket and straps used for garage door openers, gate cards, and writing instruments.
Figure 8:
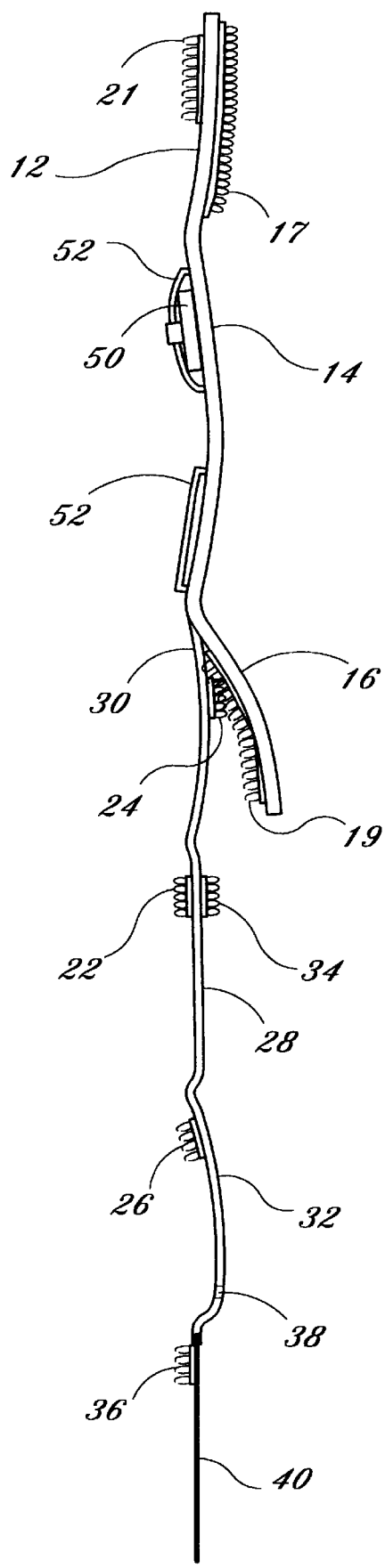
FIG. 8 is a side view of the preferred visor extension of the instant invention as it appears fully opened, to illustrate the various attaching strips.

With reference to the drawings, FIGS. 1–9 depict the preferred embodiment of the visor extension of the instant invention which is generally referenced by the numeric character 10. The inventive visor extension 10 comprises a visor wrap 11 formed by a plurality of panels/flaps 12, 14, 16, an adjustable shade 27, a reinforcement shield 40, and an attaching means 20 for securing the visor extension 10 to the visor 1 and for securing the shade 27 in select positions. The visor wrap 11 comprises a sheet which wraps around the visor 1 and is secured thereto by the attaching means 17,19,191. Preferably, the sheet comprises three panels, 12, 14, 16, whereby two outside flaps 12, 16 overlap and attach to each other. The upper flap 12 has at least one hook and loop strip 17 attached to its inside surface 12a. The strip(s) may be attached by stitching, adhesives, or other known means. When in the vertical position as shown in FIG. 5, the hook and loop strip 17 easily adjusts to the size of the visor 1. At least one corresponding hook and loop strip 19 is attached by similar means to the outside surface 16b of the lower flap 16 in a complementary position, such as vertical or horizontal, as seen in FIGS. 5 and 9. To install, the inside surface 14a of the center panel 14 is placed against the visor, the lower flap 16 is drawn upward, and the upper flap 12 is positioned over the lower flap 16 such that the hook and loop strips 17 join to the corresponding hook and loop strip(s) 19.

The adjustable shade 27 preferably comprises a second sheet appearing to have an upper panel 30, a center panel 28, and a lower panel 32. The shade 27 extends outward from the visor wrap 11. The shade 27 has a fixed end which is secured to the visor wrap 11 by stitching or other suitable means proximal the seam between the center panel 14 and the lower flap 32. A retaining shield 40 is permanently attached to the opposite free end of the shade 27 by stitching or other known means. The shade 27 is folded upward about the shield 40 several times and releasably attached to the outside surface 16b of the visor wrap lower flap 16 when not in use. The shade 27 is held in the closed position by at least one hook and loop patch 21 and a corresponding hook and loop patch 22. The hook and loop patch 21 is attached to the outside surface 12b of the upper flap 12 and the corresponding hook and loop patch 22 is attached to the outside surface 28b of the center shade panel 28.

Figure 1:
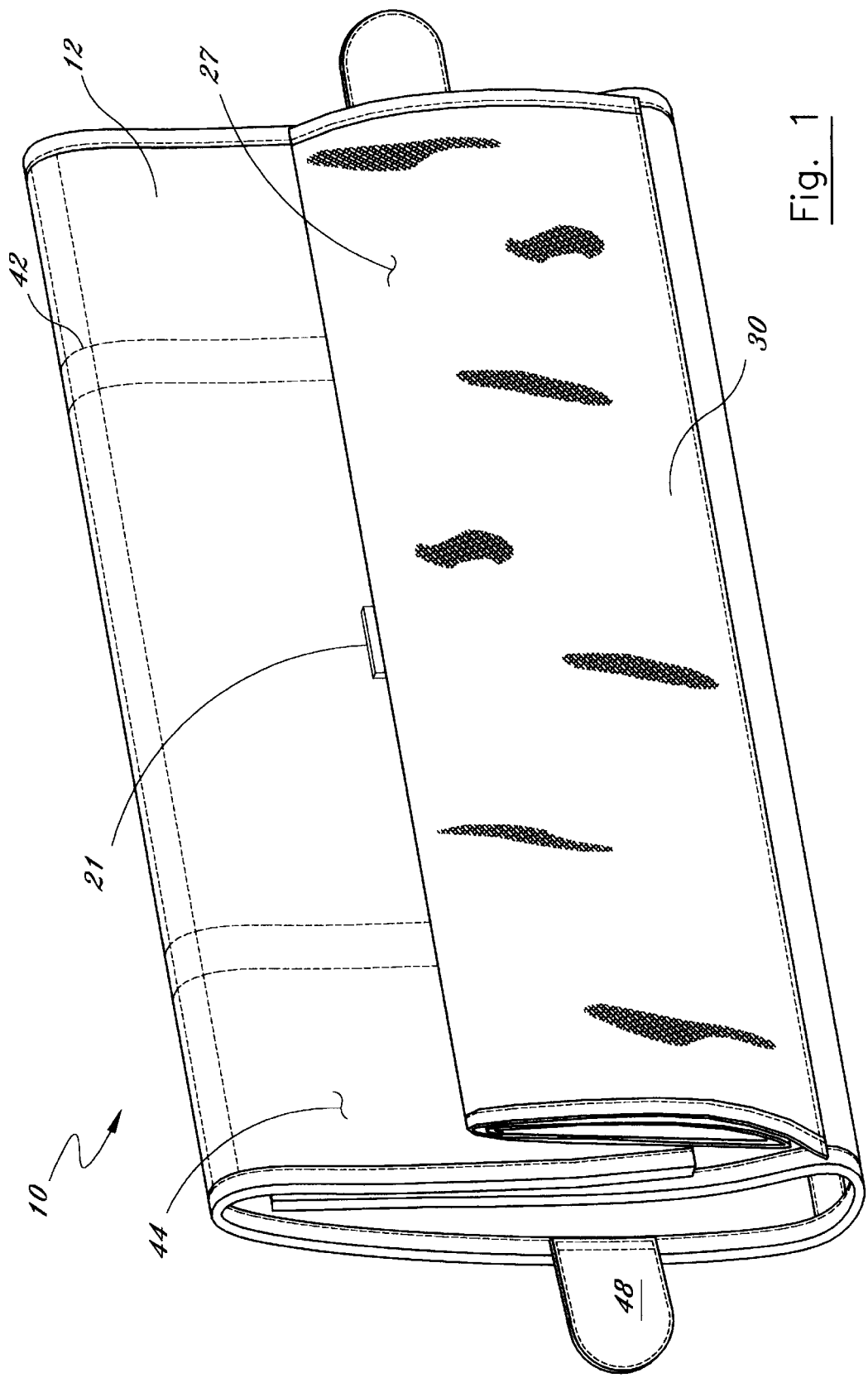
FIG. 1 is a perspective view of the visor extension of the instant invention showing the shade in its closed position.
Figure 2:
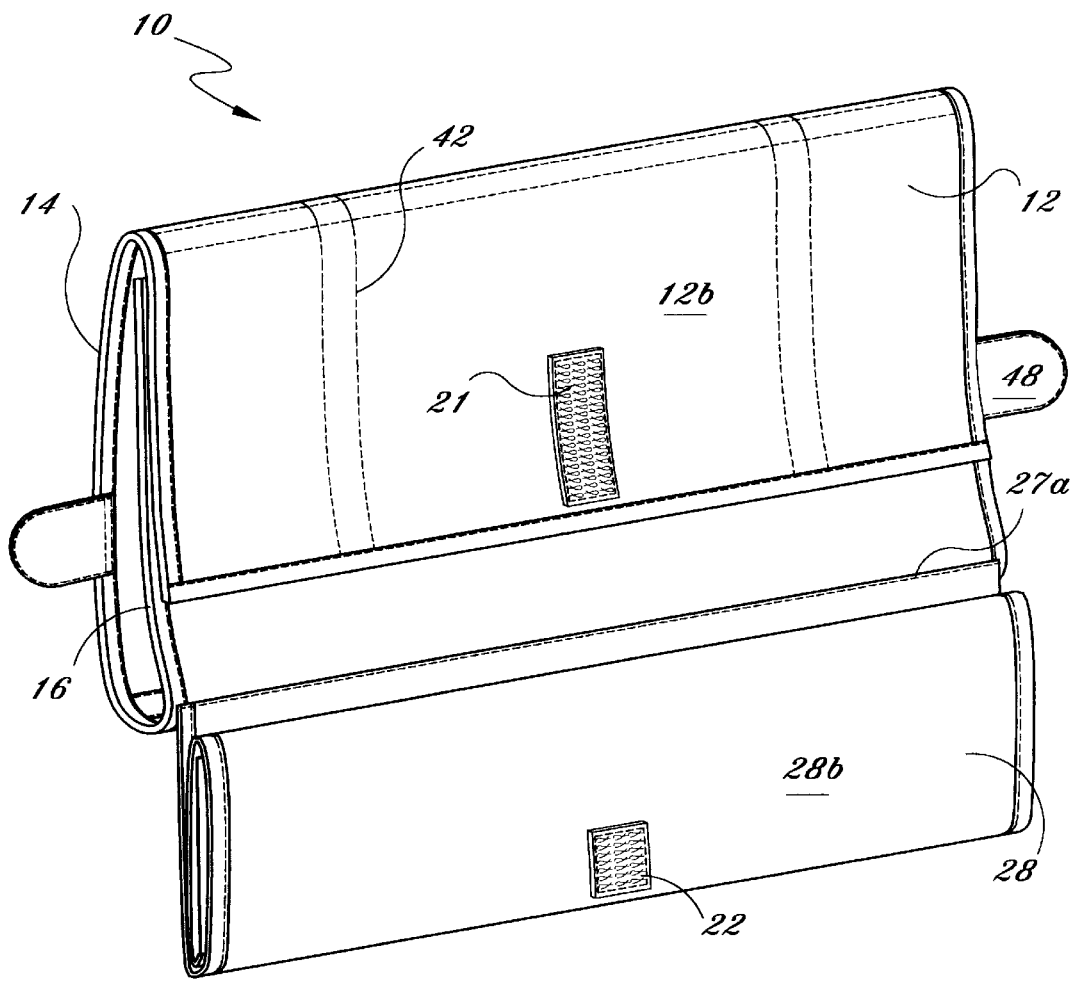
FIG. 2 is a perspective view of the visor extension of the instant invention illustrating the adjustable shade in a first open position.

With reference to FIG. 2, in a first position, the shade is unfolded 180 degrees from the closed position to provide a first level of protection from sunlight or headlights penetrating just below the visor 1. The shade 27 is held in the first position by a hook and loop strip 24 and a corresponding hook and loop strip 26. The hook and loop strip 24 is attached to the inside surface 30a of the upper shade panel 30 and the corresponding hook and loop strip 26 is attached to the outside surface 32b of the lower shade panel 32. The hook and loop patches 24, 26 may be secured to the shade by stitching, adhesives, or other known means. The hook and loop patches 24, 26 are positioned so that they join when the shade is in the first position, as shown in FIG. 2. In the first position, the visor is extended approximately 3 to 6 inches, depending on the width of the shade panels.

With reference to FIG. 3, in a second position, the shade 27 is unfolded downward 180 degrees to move the shade 27 to a second lower level or second position below the visor for even more protection. In the second position, the inside surface 30a of the upper shade panel 30 and the outside surface 32b of the lower shade panel are facing the same direction outward. The shade is held in the second position by hook and loop patch 34 and a corresponding hook and loop patch 36. The hook and loop patch 34 is attached to the inside surface 28a of the middle shade panel 28 and the corresponding hook and loop patch 36 is attached to the outside surface 40b of the shield 40. The hook and loop patches 34, 36 may be attached by stitching, adhesives, or other known means. The hook and loop patches 34, 36 are positioned to join when the shield's outside surface 40b overlaps the upper shade panel's inside surface 30a.

In a third position, the shade 27 is completely unfolded, as seen in FIG. 4. That is, the shield is suspended freely below the visor and the visor wrap 11. The shade 27 goes from the second position to the third position by detaching the hook and loop patch 36 from the hook and loop patch 34 and rotating the lower shade panel 32 downward 180 degrees and then the shield 40 downward another 180 degrees. In the third position, the visor 1 may be rotated to the door window for shading the driver or passenger from the sun angled at the side of the car. The shade 27 is held in place by inserting the shield in between the window and frame of the door. This secures the shield while making turns, stopping, or other movement of the car which translates to the shade 27.

The shade 27 preferably defines an anchoring aperture 38 which may be used as an alternate method for securing the shade 27 against the side window or for anchoring the shield to the windshield. Sometimes a driver or passenger must wait for one or the other, with the sun beating down through the windshield. The anchoring aperture 38 is therefore intended to mate with a corresponding anchor 39 to shade the passenger. The corresponding anchor may comprise a suction cup having a protruding hook, tab, or nipple. It should be noted that other hooks or securing tabs may be employed for mating with the aperture 38 and securing the shade 27 against the windshield or side window. As an alternate method for securing the shade against the windshield, the shield 40 may be wedged between the windshield and the dashboard. To return the shade to the closed position, the shield 40 is first folded 180 degrees upward. The shield 40 and third shade panel 32 are then collectively folded upward toward the center shade panel 28 a second 180 degrees. That combination is then folded upward a third 180 degrees toward the upper shade panel 30. Finally, the compacted shade 27 is folded upward toward the upper flap 12 until the hook and loop strip 22 connects to the hook and loop strip 21.

The visor wrap 11 may comprise a durable cloth, leather, or vinyl material. The visor wrap 11 and its corresponding panels 12, 14, 16 may be adapted and sized to fit any size visor. Likewise, the shade 27 and its corresponding panels 28, 30, 32 may be sized to fit any size side window and windshield. The shade 27 may be manufactured using a screen or mesh material to allow the driver to see therethrough while still being shaded. The shade 27 may also be manufactured using plastics, waxed sheeting, or other known substitutes.

With reference to the drawings, the visor extension 10 includes at least one tab 48 for pulling and sliding the visor extension 10 along the visor. The visor extension 10 also may include reinforcement bars 46 in the visor wrap 11 to add structural support thereto. The reinforcement bars 46 are preferably installed within the visor wrap skin 44 proximal the joints defined between the upper flap 12 and center panel 14 and the lower flap 16 and the center panel 14. The reinforcement bars 46 preferably comprise a flat, metallurgical-type material, but may also comprise a durable plastic. The vinyl wrap skin 44 may comprise a vinyl material or similar substitute as discussed herein and is formed as shown in the drawings by stitching 42. Known manufacturing substitutes may be employed without departing from the scope and spirit of the instant invention. Still referring to the drawings, the vinyl wrap has reinforced, finished edges 49 to increase the durability of the instant invention 10 and to provide a cleaner, more finished look. The shield 40 may be manufactured by any plastic or similar substitute material so long as it may be attached to the shade 27 and fitted between the window and door frame of a car.

The outside surface 14b of the visor wrap center panel 14 may include any combination of pockets 50 and elastic straps 52 for securing garage door openers, gate cards, pens, maps, or other items carried by drivers and passengers. A pocket 50 or at least one elastic strap 52 may be secured by stitching, adhesives, or other known means to the center panel's outside surface 14b. Similarly, at least one elastic strap 52, and preferably more, may be oriented and attached to the outside surface 14b.

The visor wrap 11 is wrapped around the visor 1 in a way that the visor extension 10 may be horizontally adjusted. That is, the visor extension may be slid outward along the visor so that it extends beyond the outside end of the visor. This provides the driver or passenger with horizontal adjustment for intercepting the sun at any angle. As previously discussed, the shade 27 and various attaching means 20 are used for vertically adjusting the visor extension 10.

In an alternative embodiment, the visor extension 10 may incorporate a roll-up shade instead of the foldable shade 27.

The roll-up shade is attached to the visor wrap and the shade is pulled therefrom. A suction cup and aperture in the shade are used to secure the shade against the window. Alternatively, the free end of the shade may be attached to the visor wrap 11 so that the roller is pulled away from the visor wrap 11 to extend the shade. A suction cup and aperture are still employed for securing the roller.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A visor extension accessory that provides increased window coverage for blocking out light from entering a vehicle when the accessory is mounted to a visor, said accessory comprising:

a flexible mounting sheet sized for wrapping around the visor, said sheet having an upper end and a lower end which overlap when said sheet wraps around the visor, said sheet being slidably adjustable on the visor for horizontal adjustment;

means for holding said sheet on the visor without preventing slidable movement of said sheet on the visor;

a vertically adjustable shade having an upper end fixed to said sheet and an opposite end which is extendable from said sheet; and means for vertically adjusting said shade in a plurality of different positions, said vertical adjusting means being attached to said shade, said vertical adjusting means comprising means for folding the screen and holding the screen in a desired position.

2. An accessory as recited in claim 1, wherein said holding means comprises:

means for attaching said sheet upper end and said sheet lower end together.

3. An accessory as recited in claim 2, wherein said sheet upper end comprises an upper flap and said sheet lower end comprises a lower flap, said upper and lower flaps overlapping when said sheet is mounted to the visor, said attaching means holding said upper flap and said lower flap together.

4. An accessory as recited in claim 1, wherein said holding means comprises:

a first hook and loop strip attached to said sheet proximal said upper end; and a corresponding hook and loop strip attached to said sheet proximal said lower end such that said first hook and loop strip and said corresponding hook and loop strip are joined when said sheet is wrapped around the visor.

5. An accessory as recited in claim 1, wherein said mounting sheet comprises:

a center panel;

an upper flap being foldable over said center panel; and a lower flap opposing said upper flap and being foldable over said center panel, said holding means attaching said upper flap and said lower flap together when said sheet is mounted to the visor.

6. An accessory as recited in claim 1, wherein said folding and holding means comprises:

a shield attached to the opposite end of said shade, said shield being foldable into said screen;

means for holding said shade and said shield in a folded position.

7. An accessory as recited in claim 6, wherein said holding means comprises:

a plurality of hook and loop strips secured to said shade in strategic locations such that said hook and loop strips cooperate to hold said shade in at least one folded position.

8. An accessory as recited in claim 1, wherein said adjusting means comprises:

a plurality of hook and loop strips attached to said shade for allowing said shade to be folded at least once and held in the folded position.

9. An accessory as recited in claim 1, further comprising:

a shield attached to said opposite end of said shade for folding at least once into said screen to form at least one folded combination, said adjusting means holding said shield and said sheet in said folded combination.

10. An accessory as recited in claim 9, wherein said adjusting means comprises:

a plurality of hook and loop strips attached to said shade for allowing said shield and said shade to be folded at least once and held in a folded position.

11. A visor extension accessory that provides increased window coverage for blocking out light from entering a vehicle through a window when the accessory is mounted to a visor, said accessory comprising:

a flexible mounting sheet sized for wrapping around the visor, said sheet having an upper end and a lower end which overlap when said sheet wraps around the visor, said sheet being slidably adjustable on the visor for horizontal adjustment;

means for holding said sheet on the visor without preventing slidable movement of said sheet on the visor;

a vertically adjustable shade having an upper end fixed to said sheet and an opposite end, said shade including a shield attached to said opposite end for securing said shade against a vehicle window, said shield being pivotable into said shade for folding said shield into said shade to form at least one folded combination; and means for releasably holding said shade in said folded combination.

12. An accessory as recited in claim 11, further comprising:

means for releasably attaching said folded combination to said sheet.

13. An accessory as recited in claim 12, wherein said releasable holding means comprises a plurality of hook-and-loop patches attached to said shade in predetermined locations such that said hook-and-loop strips cooperate to hold said shade in said folded combination.

14. An accessory as recited in claim 13, wherein said releasable attaching means comprises:

at least one hook-and-loop patch attached to said folded combination; and a corresponding hook-and-loop patch attached to said sheet, said hook-and-loop patch and said corresponding hook-and-loop patch being attached in locations that cause said hook-and-loop patch and said corresponding hook-and-loop patch to join.

15. An accessory as recited in claim 12, further comprising an aperture defined in said shade for attaching to a suction cup, said suction cup being releasably attachable to the vehicle window.

16. A visor extension accessory that provides increased window coverage for blocking out light from entering a vehicle through a window when the accessory is mounted to a visor, said accessory comprising:

a flexible visor wrap sized for wrapping around the visor, said sheet having an upper flap, a lower flap, and a center panel interposed said upper flap and said lower flap, said upper flap and said lower flap overlapping when said visor wrap is wrapped around the visor, said visor wrap being slidably adjustable on the visor when said upper flap and said lower are attached together;

means for attaching said upper flap and said lower flap together when said upper flap and said lower flap are overlapped around the visor without preventing slidable movement of said visor wrap on the visor;

a vertically adjustable shade having an upper end fixed to said sheet and an opposite end;

a shield attached to said opposite end for folding at least once into said shade to form at least one folded combination, wherein said folding vertically adjusts said shade;

means for releasably securing said shade and said shield in said folded combination; and means for releasably attaching said folded combination to said visor wrap.

17. An accessory as recited in claim 16, wherein said releasable securing means comprises a plurality of hook-and-loop patches attached to said shade in predetermined locations such that said hook-and-loop strips cooperate to hold said shade and said shield in said folded combination.

18. An accessory as recited in claim 17, wherein said releasable attaching means comprises:

at least one hook-and-loop patch attached to said folded combination; and a corresponding hook-and-loop patch attached to said upper flap, said hook-and-loop patch and said corresponding hook-and-loop patch being joined when said folded combination is pivoted over said upper flap.

19. An accessory as recited in claim 18, further comprising at least one tab projecting from said visor wrap for slidably adjusting said visor wrap on the visor.

* * * * *